(12) United States Patent
Ellwanger

(10) Patent No.: US 8,399,115 B2
(45) Date of Patent: Mar. 19, 2013

(54) SYSTEM AND APPARATUS FOR MONITORING LARGE BATTERY STACKS USING WIRELESS SENSOR NETWORKS

(75) Inventor: Simon Ellwanger, Palo Alto, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 990 days.

(21) Appl. No.: 12/365,760

(22) Filed: Feb. 4, 2009

(65) Prior Publication Data
US 2010/0196748 A1    Aug. 5, 2010

(51) Int. Cl.
*H01M 10/02* (2006.01)
*H01M 10/48* (2006.01)
*H01M 8/24* (2006.01)

(52) U.S. Cl. .............................. 429/90; 429/61; 429/428

(58) Field of Classification Search ........................ None
See application file for complete search history.

(56) References Cited

U.S. PATENT DOCUMENTS

| | | | | |
|---|---|---|---|---|
| 2006/0019149 A1* | 1/2006 | Mahowald | ..................... | 429/47 |
| 2006/0028172 A1* | 2/2006 | Vaillancourt et al. | ......... | 320/110 |
| 2008/0097704 A1* | 4/2008 | Notten et al. | .................... | 702/42 |
| 2008/0206627 A1* | 8/2008 | Wright | ............................. | 429/93 |
| 2009/0092862 A1* | 4/2009 | Morris et al. | ..................... | 429/9 |
| 2009/0169977 A1* | 7/2009 | Sfarzo et al. | ..................... | 429/50 |
| 2009/0286149 A1* | 11/2009 | Ci et al. | ....................... | 429/160 |
| 2009/0317694 A1* | 12/2009 | Angquist et al. | ................ | 429/50 |
| 2010/0179778 A1* | 7/2010 | Goff et al. | ....................... | 702/64 |

* cited by examiner

*Primary Examiner* — Krishnan S Menon
(74) *Attorney, Agent, or Firm* — Crowell & Moring LLP

(57) ABSTRACT

Monitoring individual cells within large battery stacks used in alternative fuel vehicles is provided using wireless sensor networks. In one embodiment, a battery stack comprised of a plurality of cells includes a plurality of wireless sensor nodes each electrically connected to a corresponding one of the plurality of cells. Each of the wireless sensor nodes includes a sensor circuit for measuring individual performance characteristics for cells to which the wireless sensor nodes are connected. This cell-specific performance data may then be wirelessly transmitted to an external node, which is coupled to a vehicle battery management system configured to determine at least one of a state of charge, state of health and remaining useful life data for the overall battery stack based on the performance characteristics of the battery stack's individual cells.

18 Claims, 5 Drawing Sheets

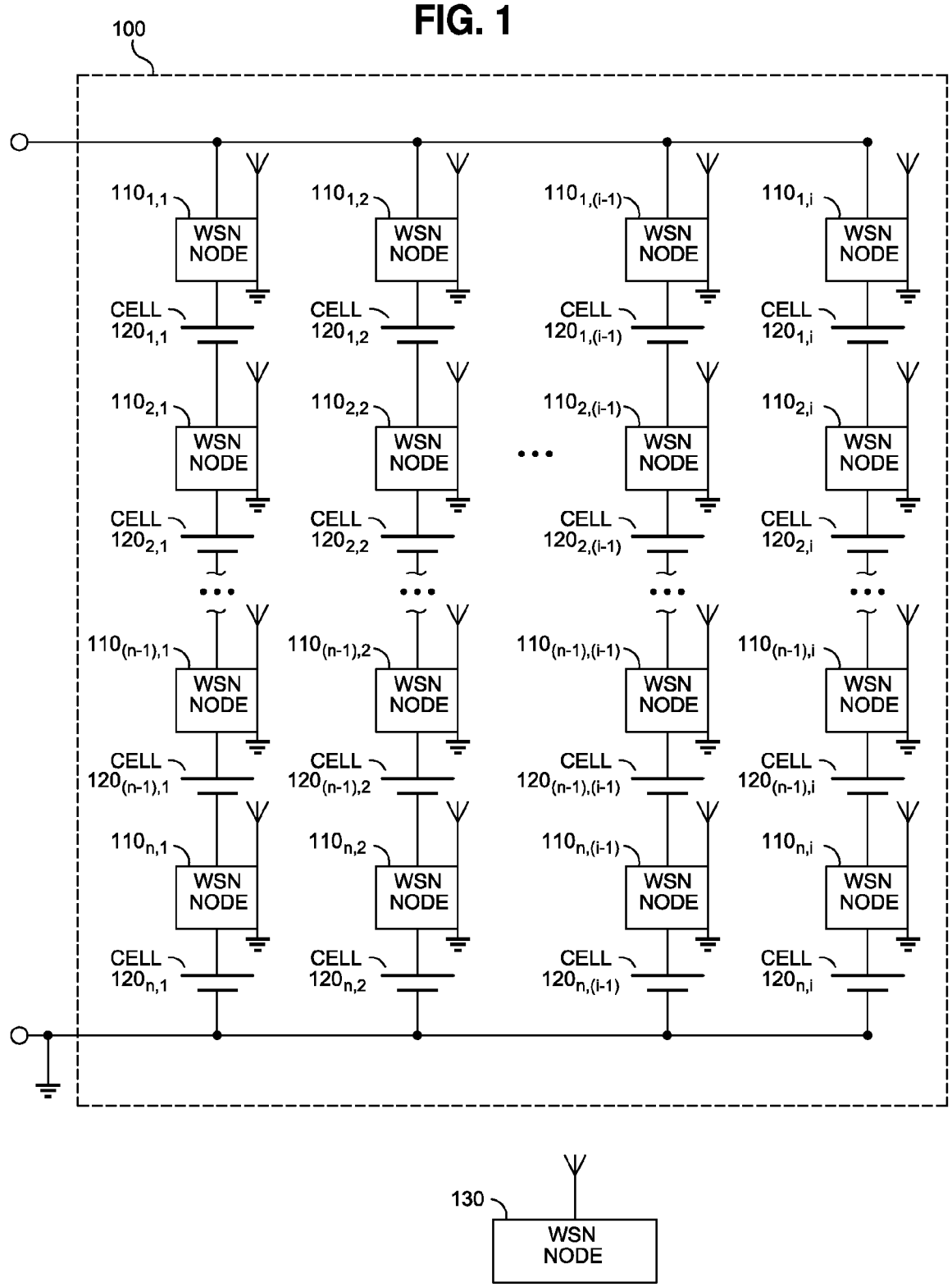

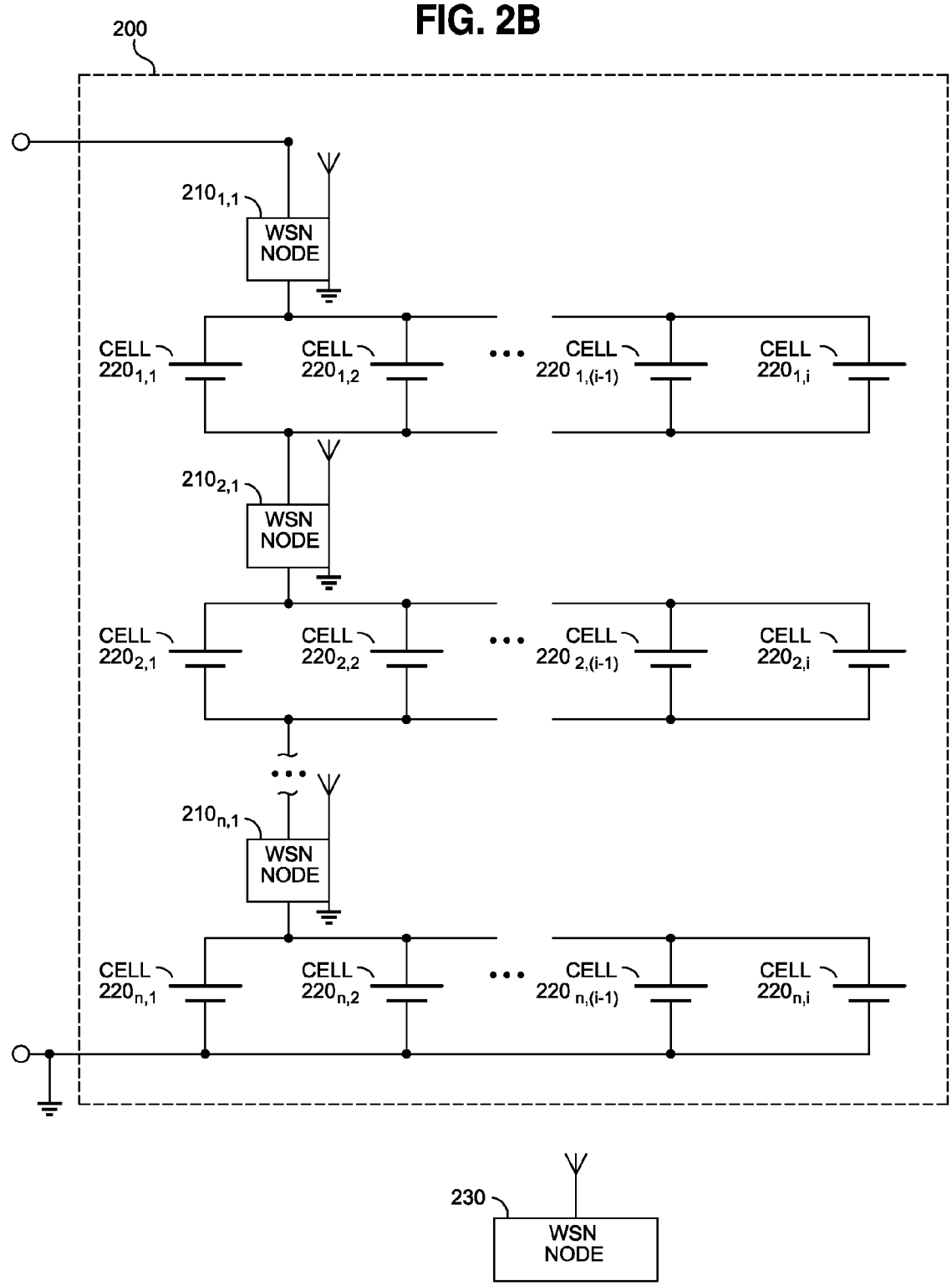

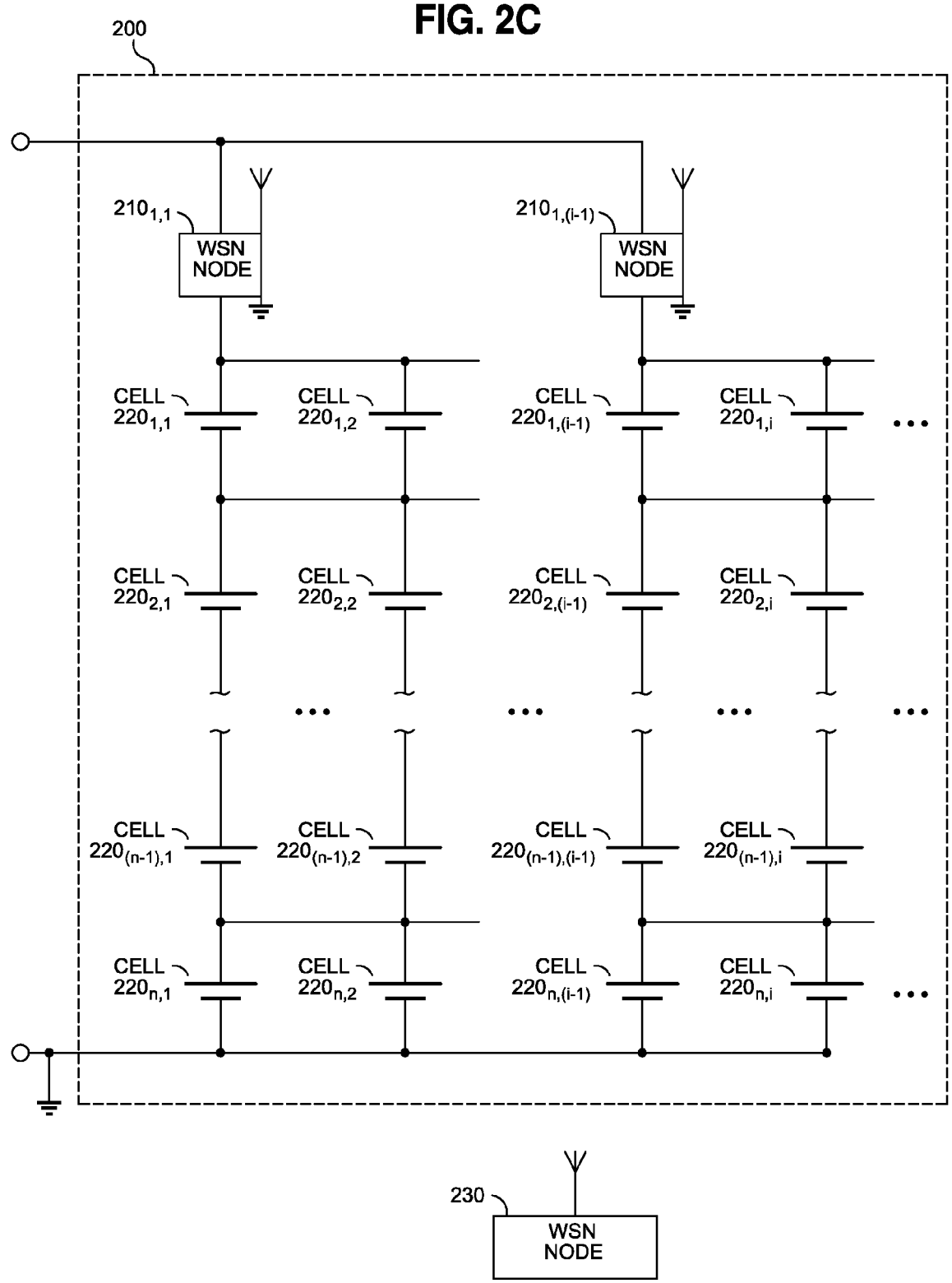

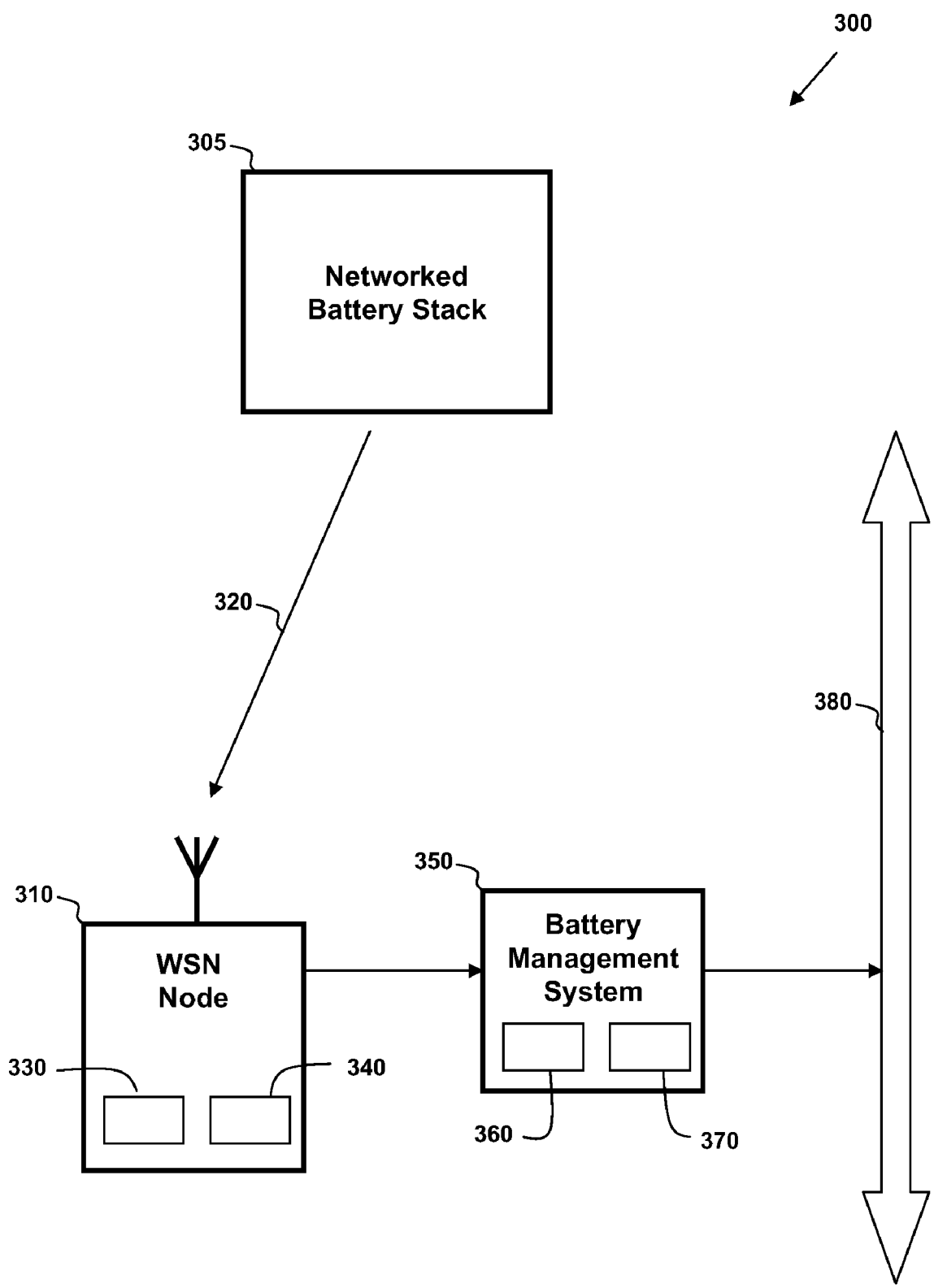

SYSTEM AND APPARATUS FOR MONITORING LARGE BATTERY STACKS USING WIRELESS SENSOR NETWORKS

FIELD OF THE INVENTION

The present invention relates in general to monitoring large battery stacks, such as the battery stacks used in battery-dependent alternative fuel vehicles, and more particularly to utilizing a wireless sensor network to monitor a plurality of performance characteristics of the individual cells that comprise such large battery stacks.

BACKGROUND OF THE INVENTION

Recently, worldwide interest in alternative fuel (e.g., battery-driven, plug-in hybrid, etc.) vehicles has increased considerably. Carbon dioxide emissions from internal combustion engines are widely considered a key factor in global warming. In general, alternative fuel vehicles are seen as much safer on the environment due to their emission-free operation.

One significant drawback for battery-based alternative fuel vehicles, including battery-driven and plug-in hybrid vehicles, is that it is very difficult to estimate or measure the remaining life of the battery. Current estimation techniques and algorithms only observe the battery as a whole. Such techniques cannot detect the difference between a good subset of batteries and a bad or even broken subset of batteries within a given stack. Even worse, if a single battery within the stack dies, this can cause deterioration of the entire stack since a single dead battery can in effect shut off an entire subset of batteries connected in series. This can in turn result in a higher currency demand for the remaining subset of batteries connected in parallel. When individual battery cells are driven outside their normal operation parameters, their lifespans can be significantly shortened, thereby making any State of Charge (SOC), State of Health (SOH) and/or Remaining Useful Life (RUL) estimations of the overall battery system unacceptably inaccurate.

In order to provide an accurate estimate of SOC, SOH or RUL, it would be necessary to know the performance characteristics, such as voltage and temperature, of each individual cell comprising the overall battery stack. However, heretofore this has been technically and economically infeasible since the large battery stacks used to power alternative fuel vehicles can consist of thousands of individual connected cells. Accordingly, there is a need in the art for a system and apparatus for monitoring the performance of individual cells within large battery stacks.

BRIEF SUMMARY OF THE INVENTION

Disclosed and claimed herein systems and apparatuses for monitoring individual cells within large battery stacks used in alternative fuel vehicles. In one embodiment, a battery stack for use in alternative fuel vehicles includes a plurality of cells electrically interconnected to collective provide power across positive and negative terminals of the battery stack. The battery stack further includes a plurality of wireless sensor nodes each electrically connected to a corresponding one of the plurality of cells. In this embodiment, each of the wireless sensor nodes includes a sensor circuit for measuring performance characteristics of a corresponding one of the cells to which the wireless sensor nodes are connected, and the wireless sensor nodes are further configured to wirelessly transmit data to an external node, where such data corresponds to the performance characteristics.

In another embodiment, a system for monitoring battery stacks in alternative fuel vehicles includes a battery stack that includes a plurality of cells electrically interconnected to collectively provide power across positive and negative terminals of the battery stack. The battery stack further includes a plurality of wireless sensor nodes each electrically connected to a corresponding one of the plurality of cells. The wireless sensor nodes each includes a sensor circuit for measuring performance characteristics of the correspondingly connected cells. The system further includes an external node configured to wirelessly receive data from the wireless sensor nodes, where the data corresponds to the performance characteristics. The system also includes a vehicle battery management system configured to determine at least one of a state of charge, state of health and remaining useful life data for the battery stack based on the performance characteristics of the individual cells.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 depicts a simplified schematic diagram of a large battery stack configured in accordance with the principles of the invention;

FIGS. 2A-2C depict one or more additional embodiments of the large battery stack of FIG. 1; and FIG. 3 illustrates a system diagram in which a large battery stack, configured in accordance with the principles of the invention, may be implemented.

DETAILED DESCRIPTION OF EXEMPLARY EMBODIMENTS

Figure 2A:
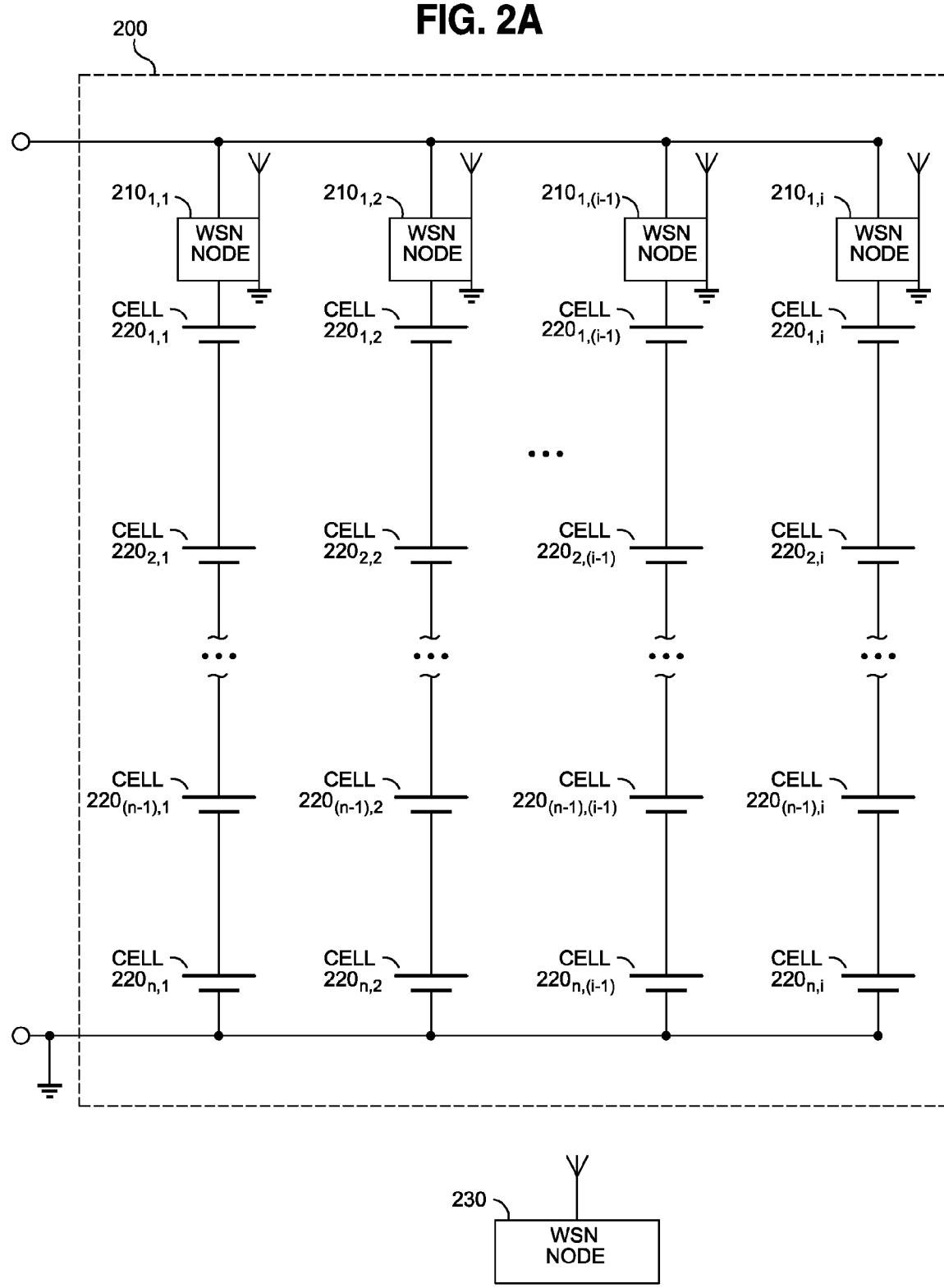

With battery-dependent alternative fuel vehicles (e.g., battery-driven, plug-in hybrid, etc.), calculating the vehicle's range, charging strategies and route planning requires an accurate estimation or measurement of SOC and SOH of the battery stack, which is not achievable by simply measuring the SOC and SOH of the overall battery stack. To that end, one aspect of the present disclosure relates generally to using wireless sensor networks to monitor individual cells within large battery stacks used in alternative fuel vehicles. As will be described in more detail below, in one embodiment a battery stack, comprised of a plurality of individual cells, includes a plurality of wireless sensor nodes each electrically connected to a corresponding one of the plurality of cells. Each of the wireless sensor nodes may include a sensor circuit for measuring the individual performance of the cell(s) to which the wireless sensor nodes are connected. This cell-specific performance data may then be wirelessly transmitted to an external node. In certain embodiments, the external node may be coupled to a vehicle battery management system that is configured to determine at least one of a state of charge, state of health and remaining useful life data for the overall battery stack based on the performance characteristics of the battery stack's individual cells.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention may described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

Referring now to FIG. 1, depicted is a simplified schematic of one embodiment of a large battery stack 100 configured in accordance with the principles of the invention. While in a preferred embodiment the battery stack 100 is usable in connection with powering alternative fuel vehicles (e.g., battery-driven, plug-in hybrid, etc.), it should equally be appreciated that the battery stack similarly may be implemented in numerous other battery-dependent applications as well (e.g., boats, motorcycles and other two or three-wheel vehicles, airplanes, etc.).

The power provided by the battery stack 100 (i.e., the voltage drop across the plus/minus terminals) is comprised of a plurality of cells $120_{1,1}$-$120_{n,i}$ (individually referred to as "a cell 120") connected in series and parallel, as depicted in FIG. 1. This plurality of cells $120_{1,1}$-$120_{n,i}$ collectively completes the internal circuit of the battery stack 100 between the positive terminal and negative terminal. As is generally known in the art of battery stacks, each of the plurality of cells $120_{1,1}$-$120_{n,i}$ may be based on any known type of battery technology, including for example rechargeable alkaline battery, nickel cadmium, nickel hydrogen, nickel metal hydride, lithium ion, lithium ion polymer, etc. In order to power vehicles, small individual battery cells (mostly between 1.2 to 3V) are stacked together to form a large "stack" of higher voltage, higher capacity and therefore more power. Cells are connected in series to gain higher voltage and in parallel in order to provide more electric current.

Continuing to refer to FIG. 1, the battery stack 100 is further comprised of a plurality of wireless sensor nodes $110_{1,1}$-$110_{n,i}$, (individually referred to as "a wireless sensor node 110") each of which is connected to a terminal of a corresponding one of the plurality of cells $120_{1,1}$-$120_{n,i}$. In certain embodiments, a given wireless sensor node 110 may be connected in series between two of the cells 120.

The plurality of wireless sensor nodes $110_{1,1}$-$110_{n,i}$ in combination with the external WSN node 130, forms the wireless sensor network (WSN) 140. As is generally known, WSNs were originally developed for military applications such as battlefield surveillance and are comprised of spatially distributed autonomous nodes that include sensors to cooperatively monitor physical or environmental conditions, such as temperature, sound, vibration, pressure, motion or pollutants.

Each of the wireless sensor nodes $110_{1,1}$-$110_{n,i}$ may comprise a wireless transmitter or transceiver circuit, and at least one sensor circuit for monitoring performance characteristics of a corresponding one of the plurality of cells $120_{1,1}$-$120_{n,i}$. The external WSN node 130 may comprise a receiver or transceiver circuit for receiving signals from the plurality of wireless sensor nodes $110_{1,1}$-$110_{n,i}$.

With respect to the sensor circuit(s), it should be appreciated that any known sensor circuit may be used which is capable of detecting voltage, current and/or temperature. By way of providing a non-limiting example, the CSA-1V current sensor manufactured by Melexis Microelectronic Systems may be used. Alternatively, integrated precision temperature sensors (such as National Semiconductor Corporation's LM34 sensor) and voltage battery sensors (such as Microchip Technology Incorporated's MCP 111/112 voltage detector) may be used. However, any available sensor circuit capable of monitoring the performance characteristics of the individual cells $120_{1,1}$-$120_{n,i}$ would be consistent with the principles of the invention.

The WSN 140, comprised of the plurality of wireless sensor nodes $120_{1,1}$-$120_{n,i}$ and the external WSN node 130, may be IEEE 802.15.4 compliant, which allows mesh-networks of up to 64,000 nodes in one network. However, other wireless communications standards may similarly be used. By way of a non-limiting example, the Mote-on-Chip IA-510 DN2510 manufactured and sold by Dust Networks, Inc., or Embers EM250 ZigBee Development Kit, may be used in connection with the wireless sensor nodes $110_{1,1}$-$110_{n,i}$ of FIG. 1.

As with any WSN node, the wireless sensor nodes $110_{1,1}$-$110_{n,i}$ and external WSN node 130 may further include a small microcontroller and an energy source. However, in one embodiment the energy of source for the plurality of wireless sensor nodes $110_{1,1}$-$110_{n,i}$ may be provided by the corresponding plurality of cells $120_{1,1}$-$120_{n,i}$ to which they are connected. In this fashion, an even smaller footprint for the nodes may be obtained by eliminating the need for a separate power source.

In certain embodiments, the WSN 140 may be configured in accordance with the "Smart Dust" concept developed by the University of Berkeley for providing a sensor/communication system integrated into a cubic millimeter package. The concept of "Smart Dust" is to provide small, power efficient and inexpensive sensors that have tiny batteries and communicate wirelessly. These sensors can form a mesh-network and route information to the desired destination without the help of a central server. However, as mentioned above, one aspect of the present invention is to eliminate the traditional power source of the plurality of wireless sensor nodes $110_{1,1}$-$110_{n,i}$ comprising the WSN 140 since each of the nodes will necessarily be connected to a cell 120 that is to be monitored.

In certain embodiments, upon initialization of the WSN 140, the wireless sensor nodes $110_{1,1}$-$110_{n,i}$ may detect and transmit data representative of the battery performance characteristics being monitored (e.g., voltage, current and/or temperature). This performance data may then be received by the external WSN node 130, which in certain embodiments is external to the battery stack 100. As will be described in more detail below with reference to FIG. 3, this performance data may then be used by the vehicle's battery management system to provide an accurate measurement of the SOC, SOH and/or RUL of the overall battery stack.

It should further be appreciated that each of the wireless sensor nodes $110_{1,1}$-$110_{n,i}$ may engage in bidirectional communication with the external WSN node 130, and hence with the vehicle's battery management system. In this fashion, the wireless sensor nodes $110_{1,1}$-$110_{n,i}$ may be further used to control the particular cell(s) to which they are connected. For example, the vehicle's battery management system, by way of the external WSN node 130, may transmit commands to the plurality of cells $120_{1,1}$-$120_{n,i}$. Such commands may cause one or more cells to limit their current flow, or to even completely shut down in order to preserve the battery stack as a whole. In such an embodiment, each of the plurality of cells $120_{1,1}$-$120_{n,i}$ may be further configured with a microcontroller that, in response to an instruction from the vehicle's battery management system, is configured to limit or stop the cell's flow of current.

Another aspect of the battery stack 100 is to not require that each of the wireless sensor nodes $110_{1,1}$-$110_{n,i}$ be pre-configure before assembly. That is, a given wireless sensor node 110 can detect its membership to a given battery stack by listening to the IDs transmitted by its neighboring nodes. Since the position of the individual sensors in a given battery stack will not change after assembly, it is possible for each individual network node to determine which battery stack it belongs to. To manually speed up that process, one could temporarily shield the battery stack from all other radio waves (e.g., during or shortly after production) and then have each node transmit its ID, thereby providing a convenient means to learn a given mesh network configuration.

Similarly, each of the wireless sensor nodes $110_{1,1}$-$110_{n,i}$ can also detect which battery stack it is associated with by listening and learning a battery-specific security code which may be transmitted upon powering on, for example. Alternatively, or in addition, the wireless sensor nodes $110_{1,1}$-$110_{n,i}$ may transmit a cell-specific identification code, along with the performance characteristic data, such that the data can be associated with the specific cell(s) 120 to which the data pertains.

While in the configuration of FIG. 1, each of the plurality of cells $120_{1,1}$-$120_{n,i}$ has a corresponding wireless sensor node 110 attached, it should also be appreciated that it may be preferable to reduce the number of nodes used by assigning more than one of the plurality of cells $120_{1,1}$-$120_{n,i}$ to a particular wireless sensor node 110. To that end, FIG. 2A depicts another embodiment of the battery stack FIG. 1. In particular, in the embodiment of battery stack 200, a single wireless sensor node $210_{1,1}$ has been assigned and connected to a single series of cells (e.g., cells $220_{1,1}$-$220_{n,1}$). Similarly, the adjacent series of cells $220_{1,2}$-$220_{n,2}$ may be monitored by wireless sensor node $210_{1,2}$, and so on. The series-specific wireless sensor nodes $210_{1,1}$-$210_{1,i}$ may then communicate with the external WSN node 230, as described above with reference to FIG. 1.

Referring now to FIG. 2B, the wireless sensor nodes $210_{1,1}$-$210_{n,i}$ may also be connected to a subset of the plurality of cells $220_{1,1}$-$220_{n,i}$ on a parallel basis. That is, rather than a single wireless sensor node $2101_{1,1}$ being assigned and connected to series of cells, as with the embodiment of FIG. 2A, each wireless sensor node 210 may be connected to a sequence of parallel cells (e.g., cells $220_{1,1}$-$220_{1,i}$). Similarly, the adjacent row of cells $220_{2,1}$-$220_{2,i}$ may be monitored by wireless sensor node $210_{2,1}$, and so on. The row-specific wireless sensor nodes $210_{1,1}$-$210_{n,1}$ may then communicate with the external WSN node 230, as described above with reference to FIG. 1.

Finally, FIG. 2C depicts still another embodiment of a battery stack 200 in which the wireless sensor nodes $210_{1,1}$-$210_{n,i}$ are connected to a subset of cells that comprises a particular sector of the battery stack 200. For example, wireless sensor node $210_{1,1}$ is connected to assigned monitoring responsibility for the sector containing cells $220_{1,1}$; $220_{1,2}$; $220_{2,1}$ and $220_{2,2}$. In this fashion, cost may be reduced by reducing the number of wireless sensor nodes, while still maintaining the ability to monitor cells on a more individualized basis.

FIG. 3 depicts an exemplary system 300 comprised of a networked battery stack 305, which may be configured as battery stack 100 or 200 of FIGS. 1 and 2A-2C. As detailed above, the networked battery stack 305 may communicate wirelessly with an external WSN node 310 (e.g., WSN 130 or 230) via wireless communication link 320. The networked battery stack 305 may be configured to collect and transmit to WSN node 310 data corresponding to the performance characteristics of individual cells (e.g., cells $120_{1,1}$-$120_{n,i}$) within the networked battery stack 305, such as data corresponding to the individual cells' voltage, current and/or temperature. In certain embodiments, the WSN node 310 may further comprise a processor 330 for executing computer program code stored in an internal memory 340. This computer program code may correspond to processing performance characteristics data received from the networked battery stack, transmitting commands to the individual wireless sensor nodes in the networked battery stack 305, and for providing the performance characteristics data to the vehicle's battery management system. It should further be appreciated that the data provided by the networked battery stack 305 to the WSN node 310 may further include cell-specific identification information such that the performance characteristic data may be directly associated with the specific cell(s) to which the data pertains.

WSN node 310 may be electrically connected to a battery management system of the vehicle 350, which itself may include an internal processor 360 for executing computer program code stored in an internal memory 370. While details of vehicle battery management systems are known in the art, it should be appreciated that the vehicle battery management system 350 may include processor 360 for executing computer program code stored in memory 370 in order to cause the battery management system 350 to compute SOC, SOH and/or RUL for the entire battery stack 300 based on the received cell-specific performance characteristics (e.g., voltage, current and/or temperature). Once SOC, SOH and/or RUL values have been computed, the battery management system 350 may provide this data to one or more user output devices, such as a vehicle display (not shown) that is connected to the vehicles bus 380. Additionally, the battery management system 350 may similarly store this data for later retrieval and/or provide the information to a technician in connection with performing vehicle diagnostics.

The vehicle battery management system 350 may further be configured to provide instructions to the networked battery stack 305, via the WSN node 310, in order to adjust the power levels of the individual cells which comprise the networked battery stack 305. Such power level adjustment instructions may be provided to one or more specific cells within the networked battery stack 305 using cell-specific identification information contained within the performance characteristic data provided by the networked battery stack 305.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A battery stack for use in alternative fuel vehicles, the battery stack comprising:
   a positive terminal and a negative terminal;
   a plurality of cells electrically interconnected to collective provide power across the positive terminal and negative terminal; and
   a plurality of wireless sensor nodes each electrically connected to a corresponding one of the plurality of cells, wherein each of the plurality of wireless sensor nodes includes a sensor circuit for measuring one or more performance characteristics of the corresponding one of the plurality of cells,
   wherein each of the plurality of wireless sensor nodes are further configured to wirelessly transmit data to an external node, wherein the data corresponds to the one or more performance characteristics.

2. The battery stack of claim 1, wherein the performance characteristics include at least one of current, voltage and temperature.

3. The battery stack of claim 1, wherein each of the plurality of wireless sensor nodes is powered by an electrically connected corresponding one of the plurality of cells.

4. The battery stack of claim 1, wherein each of the plurality of wireless sensor nodes further includes a transmitter circuit for transmitting data to the external node corresponding to the one or more performance characteristics.

5. The battery stack of claim 1, wherein the plurality of wireless sensor nodes, in combination with the external node, together form a wireless sensor network.

6. The battery stack of claim 5, wherein the wireless sensor network is compliant with the IEEE 802.15.4 standard.

7. The battery stack of claim 1, wherein the plurality of wireless sensor nodes are further configured to wirelessly receive instructions from the external node for adjusting a power level of the corresponding electrically connected plurality of cells.

8. The battery stack of claim 1, wherein the external node is further configured to provide said data, received from the plurality of wireless nodes, to a battery management system of a vehicle in which the battery stack is installed.

9. The battery stack of claim 8, wherein the one or more performance characteristics of the plurality of cells are usable by the battery management system to determine a state of charge, state of health and remaining useful life data for the entire battery stack.

10. A system for monitoring battery stacks in alternative fuel vehicles, the system comprising:
    a battery stack including:
        a positive terminal and a negative terminal,
        a plurality of cells electrically interconnected to collectively provide power across the positive terminal and negative terminal, and
        a plurality of wireless sensor nodes each electrically connected to a corresponding one of the plurality of cells, wherein each of the plurality of wireless sensor nodes includes a sensor circuit for measuring one or more performance characteristics of the corresponding one of the plurality of cells;
    an external node configured to wirelessly receive data from the plurality of wireless sensor nodes, wherein the data corresponds to the one or more performance characteristics; and
    a vehicle battery management system electrically connected to the external node, the vehicle battery management system configured to determine at least one of a state of charge, state of health and remaining useful life data for the battery stack based on said one or more performance characteristics of the plurality of cells.

11. The system of claim 10, wherein the performance characteristics include at least one of current, voltage and temperature.

12. The system of claim 10, wherein each of the plurality of wireless sensor nodes is powered by an electrically connected corresponding one of the plurality of cells.

13. The system of claim 10, wherein each of the plurality of wireless sensor nodes further includes a transmitter circuit for transmitting data to the external node corresponding to the one or more performance characteristics.

14. The system of claim 10, wherein the plurality of wireless sensor nodes, in combination with the external node, together form a wireless sensor network.

15. The system of claim 14, wherein the wireless sensor network is compliant with the IEEE 802.15.4 standard.

16. The system of claim 10, wherein the plurality of wireless sensor nodes are further configured to wirelessly receive instructions from the vehicle battery management system for adjusting a power level of the corresponding electrically connected plurality of cells.

17. The system of claim 10, wherein the battery stack and vehicle battery management system are installed in an alternative fuel vehicle.

18. The system of claim 17, wherein the vehicles battery management system is further configured to provide one or more of the state of charge, state of health and remaining useful life data for the battery stack to a user output device of the alternative fuel vehicle.

* * * * *